E. C. Brown.
Corn & Seed-Planter.
Nº 75850. Patented Mar. 24, 1868.
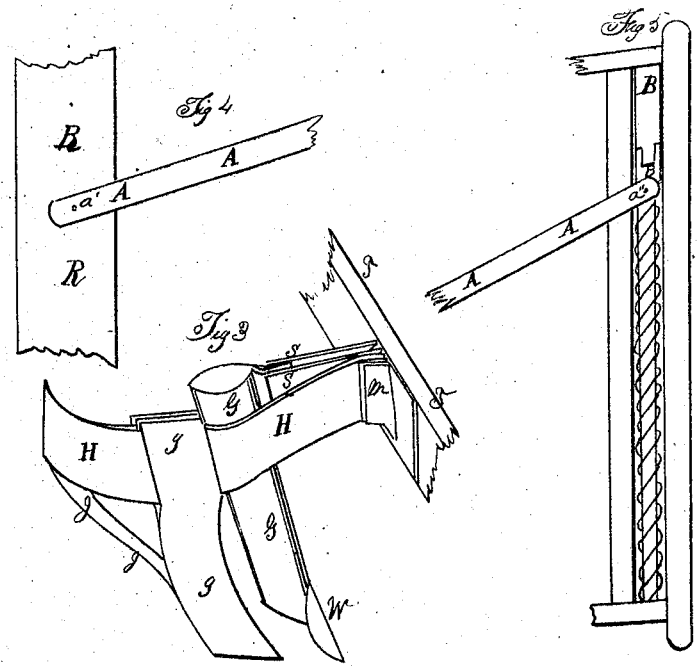
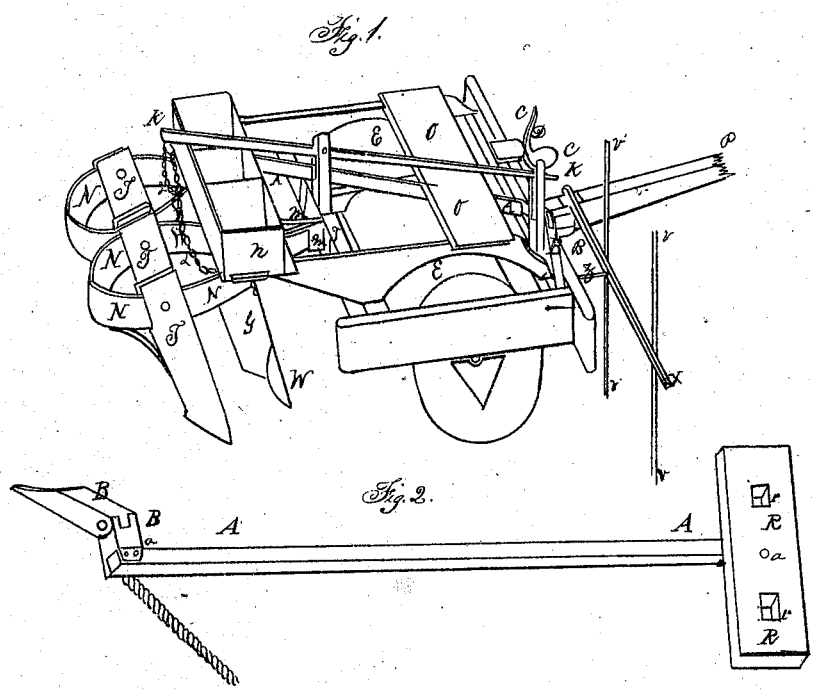
Witnesses
Washington Holloway
Abraham Herr
Inventor
Elijah C. Brown

United States Patent Office.

ELIJAH C. BROWN, OF CRAWFORDSVILLE, INDIANA.

Letters Patent No. 75,850, dated March 24, 1868.

---

IMPROVEMENT IN CORN AND SEED-PLANTER.

---

The Schedule referred to in these Letters Patent and making part of the same.

---

TO ALL WHOM IT MAY CONCERN:

Be it known that I, ELIJAH C. BROWN, of the town of Crawfordsville, in the county of Montgomery, and in the State of Indiana, have invented an Improvement in Corn and Seed-Planters; and I do hereby declare that the following is a full, clear, and exact description thereof, reference being had to accompanying drawings, and letters and figures of reference marked thereon.

The nature of the invention consists in a device, attached to a corn and seed-planter, by means of which the driver can, without dismounting at any time, drop the seed or corn at pleasure, said device to be made of wood and iron, or any other suitable materials.

To enable others skilled in the art to make and use my said invention, I proceed to describe it more fully, as follows:

In the bottom of the seed-box N, of Figure 1, of the accompanying drawings, is a movable slide, which is perforated with proper holes, represented by $r\ r$ of Figure 2 of the accompanying drawings, corresponding with holes in the bottom of the seed-box N, for the passage of the corn and seed in the ordinary way, to which is attached, by a proper joint, one end of the lever, represented by A A of said fig. 1, and Figures 2, 4, 5, of the accompanying drawings. The other end of said lever A A is attached, by another suitable joint, to the arm B, in manner and form as represented by $a''$, of said figs. 2 and 5, and hung on a centre, so as to be free to move around it in a horizontal plane. The arm B is attached, by a joint at one end, to the spiral spring Q Q, of said figs. 2 and 5, and at the other end, by another joint, to the arm B', which rests with one end in the joint of said B, and the other on the side of the frame of the machine, the said band B' and the said spring Q being, when in their proper places, as delineated by the said fig. 5, and there marked by their appropriate letters, respectively. A seat, O, and foot-rests, D D, are provided for the driver, as represented in said fig. 1. The usual drill-tubes G, covering-ploughs F, and rollers E E are provided also, as represented by fig. 1 and said fig. 3, respectively.

To use said machine, the driver, after having properly filled the seed-box N, takes his place on the seat O, and rests the heel of his right foot on the said B, and his left foot on the said foot-rest D. When the machine has passed over space enough for the distance between two rows of the vegetable he is planting, he presses his right foot on the said B; that, by opening out from the said B' against the spring Q, will cause the lever A A to oscillate around its centre, and carry the slide R R, in the bottom of the seed-box, far enough to let the corn or seed drop through the drill-tooth G into the ground, where it is covered up with the covering-ploughs F F. When the pressure of the foot is removed, the elasticity of the spring Q will carry back the said B and B'', the said lever A A, and the said slide R R to their original positions, and so this can be repeated, until all the supply of seed in the seed-box is exhausted, when the seed can be filled, and the planting again renewed, as aforesaid.

What I claim, and desire to secure by Letters Patent, is—

1. The two arms B and B', and the spring Q, when the same are constructed, combined, and used in manner and form as aforesaid.

2. The combination of the said B and B' and Q, with the said lever A A and the said sliding bottom R R, for the purpose and in the manner substantially as set forth.

3. The whole combination herein set forth, when the same is constructed, combined, and used, in its several parts, substantially as set forth.

In testimony that I claim the foregoing specification, I have hereunto set my hand, this   day of   , 1867.

ELIJAH C. BROWN.

Witnesses:
WASHINGTON HOLLOWAY,
ABRAHAM HERR.